United States Patent [19]

Suematu et al.

[11] 4,172,937
[45] Oct. 30, 1979

[54] PROCESS FOR PREPARING POLYIMINES

[75] Inventors: Kazumi Suematu; Noboru Tanimura, both of Fuji; Tadaaki Ohoka, Nobeoka, all of Japan

[73] Assignee: Asahi Kasei Kogyo Kabushiki Kaisha, Osaka, Japan

[21] Appl. No.: 918,401

[22] Filed: Jun. 23, 1978

[51] Int. Cl.² .............................................. C08G 12/08
[52] U.S. Cl. ................................ 528/232; 260/33.4 R; 260/33.6 R; 260/33.8 R; 528/247; 528/248; 528/252; 528/265
[58] Field of Search ............... 528/232, 247, 248, 252, 528/265, 266, 269; 260/33.4 R, 33.6 R, 33.8 R

[56] References Cited

U.S. PATENT DOCUMENTS

| | | | |
|---|---|---|---|
| 3,503,739 | 3/1970 | Dubosc et al. | 528/266 |
| 3,516,971 | 6/1970 | D'Alelio | 528/266 |

FOREIGN PATENT DOCUMENTS

| | | | |
|---|---|---|---|
| 622556 | 1/1963 | Belgium | 528/230 |
| 51-51395 | 11/1976 | Japan | 528/230 |

OTHER PUBLICATIONS

Stivala, S. S. et al., Polymer Letters, vol. 2, pp. 943-946 (1964).
Dyer E. et al., Journal of Polymer Science, vol. 5, Part A-1, pp. 1659-1689 (1967).
D'Alelio, G. F. et al., Journal of Macromolecular Science-Reviews, Macromoleculare Chemistry, vol. C (3) 1, pp. 105-234 (1969).
D'Alelio, G. F. et al., Journal of Macromolecular Science Chemistry, vol. A-1 (7), pp. 1161 (pp. 1171-1173 pertinent).

*Primary Examiner*—Lucille M. Phynes
*Attorney, Agent, or Firm*—Finnegan, Henderson, Farabow & Garrett

[57] ABSTRACT

A process for preparing a polyimine comprising reacting at least one dialdehyde with at least one diamine in a reaction medium of 100 to about 40 percent by volume of a phenolic compound of the formula,

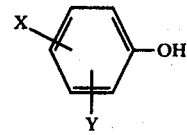

wherein X represents a hydrogen atom or a methyl group, and 0 to about 60 percent by volume of a liquid which is miscible with the phenolic compound.

20 Claims, No Drawings

PROCESS FOR PREPARING POLYIMINES

BACKGROUND OF THE INVENTION

1. Field of the Invention

This invention relates to a process for preparing polyimines. More particularly, it relates to a process for preparing polyimines having a high molecular weight using a phenolic compound as a reaction medium.

2. Description of the Prior Art

Since 1950 many researches have been done on polyimines having a plurality of the imine group (—CH=N—) in their main chain of the molecule from the viewpoint of its high bond energy and its possibility of ekaconjugation of double bond chemically formed with an appropriate atomic group. Especially, the characteristics of the imine group such as the resistance to heat, the semiconduction, the photoconduction, the photodielectric character and the insulation have been noted and studied. Also, various methods of preparing polyimines have been proposed. For example, *Polymer Letters*, 2, 943 (1964) describes a preparation of the polyimine having azulene groups in its main chain of the molecule using dimethylformamide as a solvent at the reaction temperature of 100° C., but the polyimine is only an oligomer. According to *Journal of Polymer Science*, (Part A-1), 5, 1659 (1967) various polyimines are prepared by using, as a solvent, dimethyl sulfoxide, N-methylpyrrolidone or acetic acid, but the molecular weight of these polyimines are low and at most 3,000. *Journal of Macromolecular Science* (Reviews of Macromolecular Chemistry), C(3)1, 105 (1969) describes a preparation of various polyimines by a solution polymerization method using, as a solvent, an alcohol and acetic acid, a melting method and an azeotropic method using, as a solvent, benzene. Japanese Patent Application (OPI) No. 138800/1976 describes a method of preparing fibers and films from polyimines having a low melting point in the liquid crystal state and Belgian Patent No. 622,556 describes a preparation of polyimines having aliphatic chains in the molecule using, as a solvent, benzene.

However, according to these methods it is hardly possible to produce high molecular weight polyimines, and even if high molecular weight polyimines are obtained, their processability or moldability are low.

SUMMARY OF THE INVENTION

According to the present invention there is provided a process for preparing a polyimine having repeating units of the formula, $$\{CH-R^1-CH=N-R^2-N\}$$

wherein $R^1$ represents a straight chain alkylene group having 1 to 12 carbon atoms, an alkylene group having 1 to 12 carbon atoms, and, as a branched chain, at least one alkyl group having 1 to 4 carbon atoms,

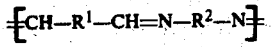

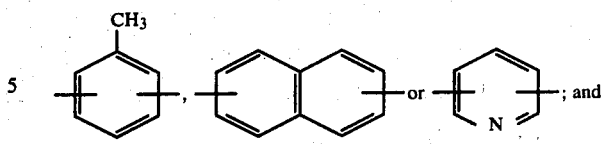

$R^2$ represents a straight chain alkylene group having 1 to 12 carbon atoms, an alkylene group having 1 to 12 carbon atoms and, as a branched chain, at least one alkyl group having 1 to 4 carbon atoms, an ether alkylene group having 2 to 6 carbon atoms and 1 to 3 oxygen atoms,

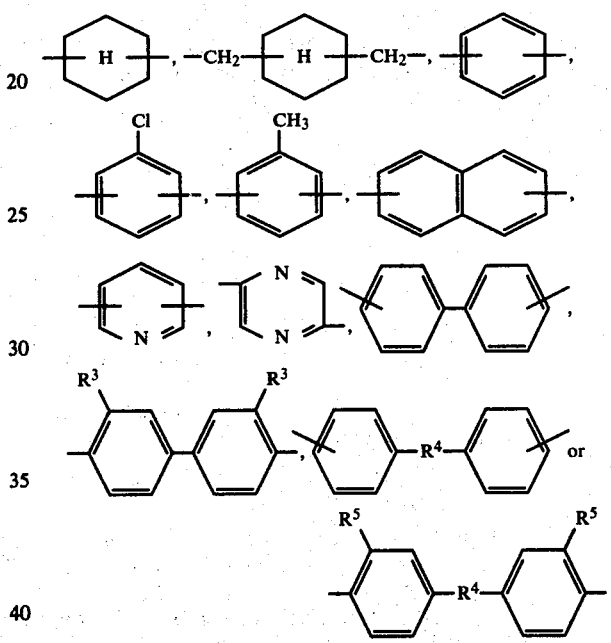

wherein $R^3$ represents a methoxy group or a chlorine atom; $R^4$ represents —O—, —S—, —SO$_2$—, —CH$_2$—, —C(CH$_3$)$_2$—, —CO$_2$—, —NH—, —CONH—, —HNOC—R$^6$—CONH— or —CONH—R$^6$—HNOC—, wherein $R^6$ represents —(CH$_2$)$_n$, n being zero or an integer of 1 to 12,

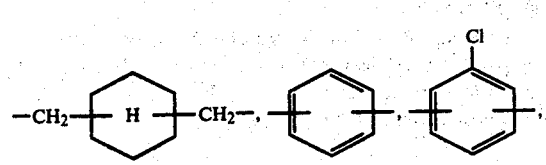

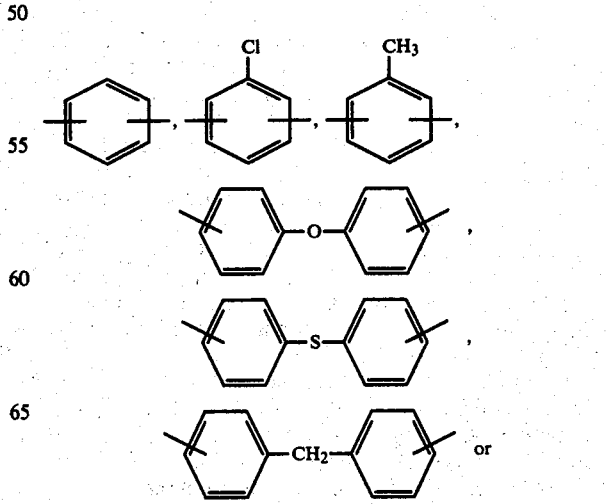

-continued

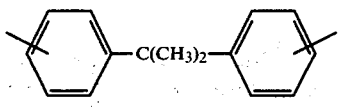

and R⁵ represents a methyl group, methoxy group or a chlorine atom,
which comprises reacting at least one dialdehyde of the formula

OCH—R¹—CHO wherein R¹ is the same as defined above, with at least one diamine of the formula

H₂N—R²—NH₂ wherein R² is the same as defined above,
in a reaction medium of 100 to about 40 percent by volume of a phenolic compound of the formula,

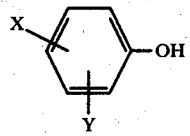

wherein X represents a hydrogen atom or a methyl group; and Y represents a hydrogen atom, a chlorine atom or a methyl group,
and 0 to about 60 percent by volume of a liquid which is miscible with the phenolic compound.

DETAILED DESCRIPTION OF THE INVENTION

Suitable dialdehydes which may be employed in this invention include ethanedialdehyde, propane-1,3-dialdehyde, butane-1,4-dialdehyde, pentane-1,5-dialdehyde, hexane-1,6-dialdehyde, heptane-1,7-dialdehyde, octane-1,8-dialdehyde, cyclohexane-1,4-dimethyldialdehyde, cyclohexane-1,3-dimethyldialdehyde, terephthalaldehyde, isophthalaldehyde, toluene-2,4-dialdehyde, toluene-2,5-dialdehyde, toluene-2,6-dialdehyde, chlorobenzene-2,4-dialdehyde, chlorobenzene-2,5-dialdehyde, chlorobenzene-2,6-dialdehyde, naphthalene-1,5-dialdehyde, naphthalene-1,8-dialdehyde, naphthalene-2,6-dialdehyde, pyridine-2,4-dialdehyde, pyridine-2,5-dialdehyde and pyridine-2,6-dialdehyde and any mixtures thereof.

Suitable diamines which can be employed in this invention include ethylenediamine, diaminobutane, hexamethylenediamine, bis(aminoethyl)propane, 1,3-diaminocyclohexane, 1,4-diaminocyclohexane, 1,3-cyclohexanedimethylamine, 1,4-cyclohexanedimethylamine, p-phenylenediamine, m-phenylenediamine 2,4-diaminochlorobenzene, 2,5-diaminochlorobenzene, 2,6-diaminochlorobenzene, 2,4-diaminotoluene, 2,5-diaminotoluene, 2,6-diaminotoluene, 1,4-diaminonaphthalene, 1,5-diaminonaphthalene, 1,8-diaminonaphthalene, 2,6-diaminonaphthalene, 2,7-diaminonaphthalene, 2,4-diaminopyridine, 2,5-diaminopyridine, 2,6-diaminopyridine, 2,5-diaminopyrazine, 3,3'-diaminobiphenyl, 4,4'-diaminobiphenyl, 3,4'-diaminobiphenyl, 3,3'-dimethoxy-4,4'-diaminobiphenyl, 3,3'-dichloro-4,4'-diaminobiphenyl, 3,3'-diaminodiphenylmethane, 4,4'-diaminodiphenylmethane, 4,4'-diaminodiphenylsulfide, 4,4'-diaminodiphenylether, 3,3'-diaminodiphenylsulfone, 4,4'-diaminodiphenylsulfone, 4,4'-diaminodiphenylpropane, 3,3'-diaminodiphenylester, 3,3'-diaminodiphenylamide, 3,3'-dichloro-4,4'-diaminodiphenylmethane, 3,3'-dichloro-4,4'-diaminodiphenylpropane,

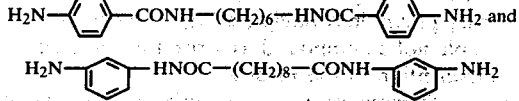

and any mixtures thereof.

Any combinations of the dialdehydes and the diamines of this invention can be employed in the present invention.

The total amount of the dialdehydes and the diamines used in this invention is not particularly limited, but generally at least about 1 g per deciliter of the reaction medium. A preferred amount ranges from about 5 g/dl to about 100 g/dl, a more preferred amount ranges from about 10 g/dl to about 50 g/dl.

Examples of suitable phenolic compounds of the formula

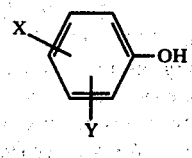

wherein
X represents a hydrogen atom or methyl group; and
Y represents a hydrogen atom, chlorine atom or methyl group,
which can be employed in this invention include phenol, o-chlorophenol, m-chlorophenol, p-chlorophenol, o-cresol, m-cresol, p-cresol, 2,4-xylenol, 3,4-xylenol, 2,5-xylenol and 3,5-xylenol and any mixtures thereof. Of these phenolic compounds, m-cresol is preferred from the viewpoint of its good solubility and its commercial availability Appropriate liquids which are miscible with the phenolic compound and which can be employed in this invention are hydrocarbons and halogenated hydrocarbons. Exemplary hydrocarbons include toluene, xylenes, diphenyl, diphenylmethane and diphenylether. Exemplary halogenated hydrocarbons include methylene chloride, chloroform, tetrachloroethane, chlorobenzene and hexafluoroisopropanol.

The amount of the liquids which can be used is at most 60 percent by volume based on the total volume of the reaction medium. A preferred amount of the liquids is at most 40 percent by volume. When the amount of the liquid is more than 60 percent by volume, the rate of polymerization is decreased and the solubility of the polyimines produced in the reaction medium is reduced.

The reaction of this invention can be conventionally carried out by mixing the dialdehydes and the diamines in the reaction medium.

The reaction temperature which can be employed in this invention is typically from about −10° C. to about 200° C., a preferred range is from about 0° C. to about 120° C., and a more preferred range is from about 5° C. to about 30° C.

The reaction time may be varied within wide limits depending upon factors such as the dialdehyde and the diamines selected, the reaction medium chosen, the reaction temperature employed and other factors. Generally, the reaction time is from about 1 minute to about 48 hours.

The reaction of this invention may be carried out either at atmospheric pressure, under a pressure above atmospheric or under a reduced pressure. But it is preferred, from an economical standpoint, to carry out the reaction at atmospheric pressure.

The reaction of this invention may also be carried out in an atmosphere of air or an inert gas such as nitrogen and argon.

The reaction of this invention is postulated to proceed as follows;

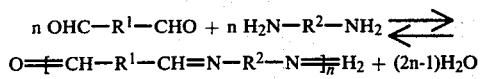

$$n\ OHC-R^1-CHO + n\ H_2N-R^2-NH_2 \rightleftarrows$$
$$O=\!\!=\!\!CH-R^1-CH=\!N-R^2-N=\!\!\!=\!\!\!H_2 + (2n-1)H_2O$$

The reaction is reversible, but the equilibrium is inclined to the direction of the product. When the product is formed and the concentration of the terminal groups becomes dilute, the equilibrium is achieved and the reaction apparently stops. In case the reaction medium, the dialdehyde and the diamine are sufficiently dried before use, the polyimine as the product becomes a high molecular weight polymer for practical uses at the equilibrium achieved. However, the molecular weight of the polyimines of this invention can be further increased by removal of the by-produced water from the reaction system using appropriate methods. Examples of suitable methods which can be employed in this invention include the addition of a dehydrating agent in the reaction medium before the reaction and the removal of part of the reaction medium from the reaction system by distillation during or after the reaction.

Exemplary dehydrating agents which can be employed in this invention include calcium chloride, lithium chloride, potassium carbonate and phosphorus pentoxide. The amount of the dehydrating agents used is typically at most 10 percent by weight based on the total weight of the dialdehyde and the diamine.

Furthermore, the process of this invention can be advantageously combined with conventional methods of polyimines using a reaction medium. More specifically, the dialdehydes and the diamines are dissolved in a reaction medium such as N,N-diamethylacetamide, dimethyl sulfoxide, N-methyl-2-pyrrolidone, acetic acid, benzene and ethanol at the reaction temperature of this invention with stirring and left to stand to precipitate the polyimines. Then, the polyimines precipitated are filtered off and dried. The polyimines thus obtained are low molecular weight polymers and their number average molecular weights are generally at most about 3,000. These low molecular weight polyimines are dissolved in the reaction medium of this invention at the reaction temperature of this invention to further advance the reaction. The resulting polymers solutions contains higher molecular weight polyimines.

The polyimines which are prepared by the process of this invention can be advantageously formed into shaped articles such as films, fibers and molded articles in the presence of the reaction medium using conventional methods. More specifically, the polymer solutions as such are charged into molds of shaped articles and then the reaction medium is removed by evaporation. Furthermore, the polyimines containing a small amount of the reaction medium can be subjected to conventional melt moldings.

Also the polyimines can be separated from the polymer solutions by precipitation in a non-solvent such as methanol for the polyimines prepared and then subjected to conventional melt moldings.

According to the process of this invention the polyimines having a number average molecular weight of from about 2,000 to about 200,000 can be prepared, and the polyimines have various advantageous such as low hygroscopicity, good wet, dry or high temperature dimension stability, high glass transition temperature, good resistance to chemicals and small change in electrical properties under wet and dry conditions and have a wide range of use such as heat resistant insulators, heat resistant coating materials, printed circuit plates, very low temperature materials, photoconductive materials, pyroelectric materials and piezoelectric materials.

The present invention will now be illustrated in more detail by the following examples. In these examples the number average molecular weight of a polymer was calculated from a relative optical density of the terminal —CHO group infrared absorption at 1700 cm$^{-1}$ to the —CH=N— group infrared absorption at 1620 cm$^{-1}$. The mechanical properties of a polymer was measured by a tension tester of giving tension in a constant rate at 20° C. in a tension rate of 40 percent per minute. The glass transition temperature was measured by a dynamic visco-elastometer at a frequency of 110 Hz in an elevating temperature rate of 4° C. per minute. The crystallinity was measured by wide angle X-ray diffractiometry. The thermogravimetric analysis was carried out in air under a condition of 10° C. per minute.

EXAMPLE 1

In 200 ml of freshly distilled m-cresol were dissolved 23.3 g of hexamethylenediamine and 26.8 g of terephthalaldehyde at 20° C. with stirring, and the viscosity of the solution rapidly increased to give a viscous polymer solution. After stirring at 20° C. for 2 hours, the polymer solution was poured into methanol to precipitate a fibrillar polymer and the polymer was filtered off and dried with hot air at 80° C. for 2 hours, resulting in 33 g of a white fibrillar polymer having a low crystallinity, a glass transition temperature of 80° C. and a melting point of 170° C. The polymer had the —CH=N— group infrared absorption at 1650 cm$^{-1}$ but did not have the terminal —CHO group infrared absorption, and thus the polymer had a high molecular weight.

The polymer was extruded from an extruder maintained at 190° C. from a spinneret having a diameter of 0.2 mm to continuously obtain a colorless transparent filament.

Also the polymer solution as described above was uniformly cast on a glass plate with a doctor knife, and in order to remove the reaction medium the whole was dried under a reduced pressure of 0.1 mm Hg at 80° C. for 4 hours, at 120° C. for 2 hours and at 160° C. for 2 hours. The film thus obtained had a thickness of 26 microns and the following mechanical properties;

Tensile Strength: 389 Kg/cm$^2$
Tensile Elongation: 11.5%
Young's Modulus: 11,585 Kg/cm$^2$

EXAMPLE 2

In a mixture of 150 ml of freshly distilled m-cresol and 50 ml of freshly distilled chlorobenzene were dissolved 23.2 g of hexamethylenediamine and 26.8 g of terephthalaldehyde at 20° C. with stirring and the solution was stirred at 20° C. for about 30 minutes, resulting in a highly viscous polymer solution. The polymer solution thus obtained was poured into methanol to precipitate a fibrillar polymer and the polymer was filtered off and dried with hot air at 80° C. for 2 hours. The polymer thus obtained had the —CH=N— group infrared absorption at 1650 cm$^{-1}$ and a number average molecular weight of about 56,000.

Also the polymer solution as described above was shaped into a film in the same manner as in Example 1 and was obtained a colorless transparent film having a thickness of 30 microns. The mechanical properties of the film were as follows;

Tensile Strength: 550 Kg/cm$^2$
Tensile Elongation: 18%
Young's Modulus: $1.1 \times 10^4$ Kg/cm$^2$

EXAMPLE 3

In 500 ml of freshly distilled m-cresol were dissolved 29 g of hexamethylenediamine, 49.5 g of 4,4'-diaminophenylmethane and 67 g of terephthalaldehyde at 20° C. with stirring. The viscosity of the solution rapidly increased and a pale green polymer solution was obtained. After stirring at 20° C. for 24 hours, the polymer solution was poured into methanol to precipitate a polymer. The polymer was filtered off and dried with hot air at 80° C. for 2 hours and 115 g of a pale yellow polymer were obtained. The polymer had a low crystallinity and the —CH=N— group infrared absorption at 1625 cm$^{-1}$ but did not have the terminal —CHO group infrared absorption, and thus the polymer had a very hight molecular weight and was a random copolymer having repeating units of the formulae

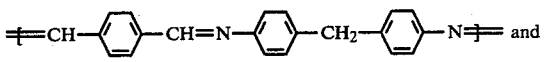 and

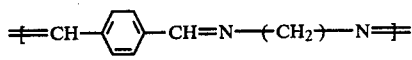

in a ratio of 1 to 1.

Also the polymer solution as described was shaped into a film in the same manner as in Example 1, resulting in a pale yellow film having a thickness of 26 microns, a high tensile elongation and a high Young's modulus. The film did not have a melting point and began to decrease in its weight at 300° C.

EXAMPLE 4

In 700 ml of freshly distilled m-cresol were dissolved 18.9 g of terephthalaldehyde and 50 g of an aromatic diamine of the formula,

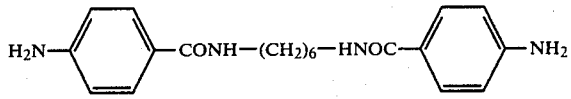

at 20° C. and the solution was stirred at 20° C. for 10 minutes and then at 90° C. for 5 hours under a nitrogen atmosphere and cooled to 20° C. The polymer solution was poured into methanol to precipitate a polymer and the polymer was filtered off and dried at 80° C. for 2 hours, resulting in a pale yellow fine powder polymer having the —CH=N— group infrared absorption at 1630 cm$^{-1}$ and the —CONH— group infrared absorption at 1600 cm$^{-1}$, a number average molecular weight of about 7,000 and repeating units of the formula,

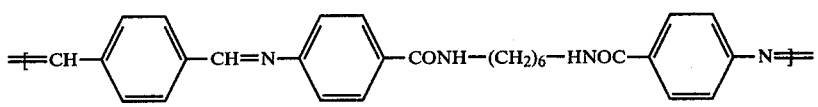

The polymer did not have a melting point and decomposed above 350° C.

EXAMPLE 5

In 100 ml of freshly distilled m-cresol was dissolved 6.7 g of terephthalaldehyde and 19.1 g of an aromatic amine of the formula,

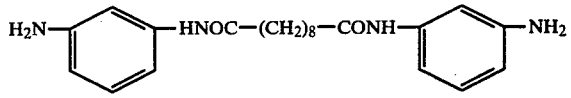

at 20° C. with vigorous stirring and the solution was stirred at 20° C. for about 40 hours. The polymer solution thus obtained was poured into methanol to precipitate a polymer and the polymer was filtered off and dried at 80° C. for 2 hours, resulting in 14 g of a brown power polymer having the —CH=N— group infrared absorption at 1660 cm$^{-1}$, the —CONH— group infrared absorption at 1600 cm$^{-1}$, a number average molecular weight of about 6500 and repeating units of the formula,

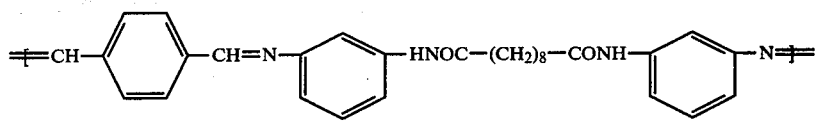

The polymer began to decompose at 300° C.

Also the polymer solution as described above was shaped into a film in the same manner as in Example 1 and was obtained a pale yellow film having a thickness of 30 microns.

EXAMPLE 6

In 200 ml of freshly distilled m-cresol were homogeneously dissolved 13.4 g of isophthalaldehyde and 19.8 g of 4,4'-diaminodiphenylmethane at 20° C. with stirring and the solution was stirred at 20° C. for 30 minutes. The polymer solution thus obtained was poured into methanol to precipitate a polymer and the polymer was filtered off and dried with hot air at 80° C. for 2 hours, resulting in 25 g of a pale yellow fibrillar polymer having the —CH=N— group infrared absorption at 1630 cm$^{-1}$, the —CH$_2$— group infrared absorption at 2900 cm$^{-1}$, the

group infrared absorptions at 1500 cm$^{-1}$ and 1600 cm$^{-1}$, a number average molecular weight of about 18,000, a glass transition temperature of 260° C. and repeating units of the formula,

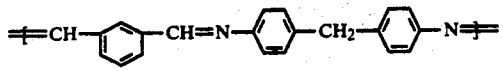

Also the polymer solution as described above was uniformly cast on a glass plate with a doctor knife, and in order to remove the reaction medium the whole was dried under a reduced pressure of 0.1 mm Hg at 80° C. for 3 hours, at 120° C. for 2 hours and at 200° C. for 2 hours to give a colorless transparent film having high tensile elongation.

EXAMPLE 7

In 280 ml of freshly distilled m-cresol were homogeneously dissolved 8 g of isophthalaldehyde and 5.4 g of terephthalaldehyde at 20° C. with stirring. To the solution was added 19.8 g of 4,4'-diaminodiphenylmethane and the resulting solution was stirred at 20° C. for about 10 minutes to give a homogeneous polymer solution having an increased viscosity. After 100 ml of the m-cresol was distilled off from the polymer solution at 80° C. under a reduced pressure of 1 mm Hg, the polymer solution was cooled to 20° C. to give a highly viscous polymer solution. Part of the polymer solution was uniformly cast on a glass plate with a doctor knife, and in order to remove the reaction medium the whole was dried under a reduced pressure of 0.1 mm Hg at 80° C. for 2 hours and at 160° C. for 2 hours, resulting in a yellow transparent film having a thickness of 30 microns, a number average molecular weight of about 5,900, a glass transition temperature of 150° C., and repeating units of the formula,

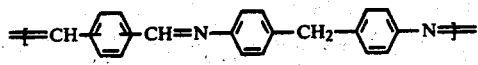

wherein the mole ratio of ⌬ to ⌬ was 6 to 4.

The mechanical properties and the resistance to chemicals of the film thus obtained were as follows;

| Mechanical Properties | |
|---|---|
| Tensile Strength: | 650 Kg/cm$^2$ |
| Tensile Elongation | 20% |
| Young's Modulus: | 8 × 10$^3$ Kg/cm$^2$ |
| Resistance to Chemicals | |
| Chemical | Performance |
| m-Xylene* | Shrinked |
| Trichloroethylene* | Shrinked |
| Acetone* | Not changed |
| Acetic acid** | Not changed |
| 10% by weight sodium | |
| hydroxide*** | Not changed |
| Dimethyl sulfoxide* | Not changed |
| Boiling water**** | Decomposed |

*Immersed in 3 days at 20° C.
**Immersed in 7 hours at 20° C.
***Immersed in 5 days at 20° C.
****Immersed in 3 hours

EXAMPLE 8

In 280 ml of freshly distilled o-cresol were added 8 g of isophthalaldehyde, 5.4 g of terephthalaldehyde and 5 g of thoroughly dried calcium chloride at 20° C. with stirring to form a solution. To the solution was added 19.8 g of 4,4'-diaminodiphenylmethane and the resulting solution was stirred at 20° C. for 5 hours. After 100 ml of the m-cresol was distilled off at 80° C. under a reduced pressure of 1 mm Hg, the polymer solution was cooled to 20° C. to give a highly viscous polymer solution. Then, the polymer solution was poured into anhydrous methanol to precipitate a polymer and the polymer was filtered off and dried at 80° C. for 2 hours, resulting in a polymer having a number average molecular weight of about 50,000. The polymer was subjected to an extrusion molding using an extruder maintained at 280° C. at a pressure of 250 Kg/cm$^2$ to give a stiff stick having a length of 3 cm and a diameter of 1 cm.

EXAMPLE 9

In 280 ml of a mixed reaction medium consisting of p-cresol and tetrachloroethane in a volume ratio of 8 to 2 were homogeneously dissolved 8 g of isophthalaldehyde and 5.4 g of terephthalaldehyde at 20° C. with stirring. To the solution was added 19.8 g of 4,4'-diaminodiphenylmethane at 20° C. with stirring and the resulting solution was stirred at 20° C. for one hour. After 100 ml of the m-cresol at 80° C. under a reduced pressure of 1 mm Hg, the polymer solution was cooled to 20° C. and poured into methanol to precipitate a yellowish orange polymer. The polymer was filtered off and dried at 80° C. for 2 hours, resulting a polymer having a number average molecular weight of about 18,000.

EXAMPLE 10

In 400 ml of a mixed reaction medium consisting of phenol and m-cresol in a volume ratio of 7 to 3 were uniformly dissolved 1.34 g of terephthalaldehyde and 12.06 g of of isophthalaldehyde at 20° C. with stirring and in the solution was dissolved 21.6 g of 4,4'-diaminodiphenylsulfide at 20° C. with stirring and the resulting solution was stirred at 20° C. for 10 minutes. Then, the polymer solution thus obtained was shaped into a film in the same manner as in Example 1 and was obtained a pale yellow transparent film having a thickness of 30 microns, a number average molecular weight of about 112,700 and repeating units of the formula,

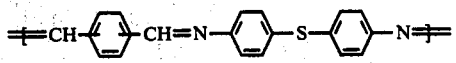

wherein the mole ratio of ⌬ to ⌬ was 9 to 1.

EXAMPLE 11

In 200 ml of ethanol were homogeneously dissolved 2.68 g of terephthalaldehyde and 10.72 g of isophthalaldehyde at 20° C. with stirring and to the solution was added 100 ml of an ethanol solution containing 19.8 g of 4,4'-diaminodiphenylethane at 20° C. with stirring to instantly precipitate a yellow polymer. The polymer precipitated was filtered off and dried at 100° C. for 2 hours. The polymer thus obtained had a degree of polymerization of 2 to 3.

In 100 ml of freshly distilled m-cresol was homogeneously dissolved 10 g of the polymer at 20° C. with stirring. After 20 ml of the m-cresol was distilled off at 80° C. under a reduced pressure of 1 mm Hg, the polymer solution was cooled to 20° C. and a high viscous polymer solution was obtained. The polymer solution was shaped into a film in the same manner as in Example 1 and was obtained a yellow film having a thickness of 30 microns, a number average molecular weight of about 5,000, a glass transition temperature of 250° C. and repeating units of the formula,

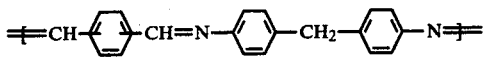

wherein the mole ratio of  to  was 8 to 2.

EXAMPLE 12

In 300 ml of freshly distilled m-cresol were dissolved 10.72 g of isophthalaldehyde and 2.68 g of terephthalaldehyde at 20° C. with stirring and to the solution was added 20.0 g of 4,4'-diaminodiphenylether with stirring and the resulting solution was stirred at 20° C. until the 4,4'-diphenylether was dissolved therein. Then, 100 ml of the m-cresol was distilled off at 100° C. under a reduced pressure of 1 mm Hg and the polymer solution was cooled to 20° C. to give a viscous solution of a polymer having repeating units of the formula,

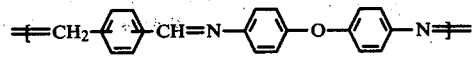

wherein the mole ratio of  to  was 8 to 2.

Part of the polymer solution was shaped into a film in the same manner as in Example 1 and was obtained a yellow film having a thickness of 30 microns, a number average molecular weight of about 7,600 and a glass transition temperature of 140° C.

EXAMPLE 13

In 200 ml of freshly distilled m-cresol were dissolved 21.6 g of 4,4'-diaminodiphenylsulfide and 13.4 g of isophthalaldehyde at 20° C. with stirring and the solution was stirred at 20° C. for about 30 minutes, resulting in a viscous polymer solution. After the polymer solution was left to stand at 20° C. for 2 weeks, the polymer solution was poured into methanol to precipitate a polymer and the polymer was filtered off and dried with hot air at 80° C. for 2 hours to give 29 g of a yellow polymer. The polymer had the —CH=N— group infrared absorption at 1630 cm$^{-1}$ and the

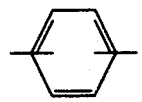

group infrared absoprtions at 1480 cm$^{-1}$ and 1580 cm$^{-1}$, a number average molecular weight of about 37,000 and repeating units of the formula

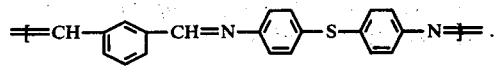

The polymer did not have a melting point and began to decompose at 400° C.

Also the polymer solution as described above was shaped into a film in the same manner as in Example 1 and was obtained a colorless yellow film having a thickness of 26 microns and a high tensile elongation and a high Young's modulus.

EXAMPLE 14

In 200 ml of freshly distilled m-cresol were dissolved 5.4 g of m-phenyldiamine, 9.9 g of 4,4'-diaminodiphenylmethane and 13.4 g of isopthalaldehyde at 20° C. with stirring and the solution was stirred at 20° C. for about 30 minutes, resulting in a viscous polymer solution. After 2 hours the polymer solution was poured into methanol to precipitate a polymer and the polymer was filtered off and dried with hot air at 80° C. for 2 hours. The polymer thus obtained had the —CH=N— group infrared absorption at 1630 cm$^{-1}$, the

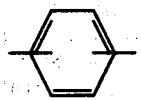

group infrared absorptions at 1500 cm$^{-1}$ and 1580 cm$^{-1}$, a number average molecular weight of about 49,000 and was a random copolymer having repeating units of the formulae

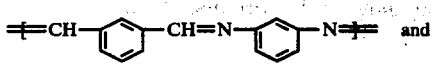 and

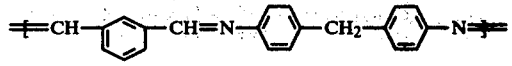

in a ratio of 1:1. The polymer did not have a melting point and began to decrease in its weight at 410° C.

EXAMPLE 15

In 200 ml of freshly distilled m-cresol were dissolved 5.4 g of m-phenylenediamine and 10.0 g of 4,4'-diaminodiphenylether at 70° C. and the solution was cooled to 20° C. and added with 13.4 g of isophthalaldehyde at 20° C. with stirring and the solution was stirred at 20° C. for about 30 minutes, resulting in a yellowish green viscous polymer solution. The polymer solution thus obtained was poured into methanol to precipitate a polymer and the polymer was filtered off and dried with hot air at 80° C. for 2 hours. The polymer had the —CH=N— group infrared absorption at 1620 cm$^{-1}$ the —O— group infrared absorption at 1230 cm$^{-1}$ and a molecular weight of about 7,000. The polymer was a random copolymer having repeating units of the formulae,

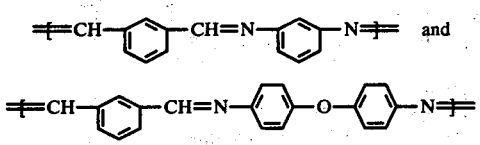

in a ratio of 1 to 1. The polymer did not have a melting point and began to decrease in its weight at 300° C.

Also the polymer solution as described above was shaped into a film in the same manner as in Example 1 and was obtained a yellowish green film having a thickness of 26 microns and a high tensile elongation and a high Young's modulus.

Furthermore, the film thus obtained was immersed in each of the chemicals set forth below at 20° C. for 3 days and the results are as follows;

| Chemical | Performance |
| --- | --- |
| 10% by weight sulfuric acid | Decomposed |
| 10% by weight sodium hydroxide | Not changed |
| Acetic acid | Not changed |
| Tetrachloroethane | Not changed |
| Tetrahydrofuran | Not changed |
| Dimethylacetamide | Not changed |
| Hexamethylphosphoric triamide | Not changed |
| m-Xylene | Not changed |

Also the film was subjected to a heat treatment at 180° C. for 6 hours to obtain a film having a high tensile elongation without any change in its appearance.

EXAMPLE 16

In 200 ml of freshly distilled m-cresol were dissolved 13.4 g of isophthalaldehyde and 10.8 g of m-phenylenediamine at 20° C. with stirring and the solution was stirred at 20° C. for about one hour, resulting in a yellowish green viscous polymer solution. The polymer solution was shaped into a film in the same manner as in Example 1 and was obtained a yellow film having a thickness of 30 microns. The film had the —CH=N— group infrared absorption at 1630 cm$^{-1}$ and the

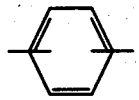

group infrared absorptions at 1480 cm$^{-1}$ and 1580 cm$^{-1}$, a number average molecular weight of about 14,000, a glass transition temperature of above 330° C., a high tensile elongation, a high tensile strength and repeating units of the formula,

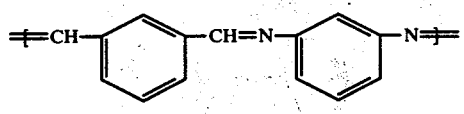

Furthermore, the film was immersed in each of the chemicals set forth below and the results are as follows;

| Chemical | Performance |
| --- | --- |
| Acetic acid | Partially corroded |
| 10% Sulfuric acid | Decomposed |
| Tetrahydrofuran | Not changed |
| Tetrachloroethane | Not changed |
| N,N-Dimethylacetamide | Not changed |
| m-Xylene | Not changed |
| 10% by weight sodium hydroxide | Not changed* |

*Even when the film was heated in 10% sodium hydroxide, any change was not observed.

EXAMPLE 17

In 400 ml of freshly distilled m-cresol were homogeneously dissolved 13.4 g of terephthalaldehyde and 12.2 g of m-tolylenediamine at 20° C. with stirring and then 100 ml of the m-cresol was distilled off at 80° C. under a reduced pressure of 1 mm Hg and the solution was cooled to 20° C. The polymer solution thus obtained was poured into methanol to precipitate a yellowish orange polymer and the polymer was filtered off, treated with methanol, again filtered off and dried at 80° C. for 2 hours under a reduced pressure of 1 mm Hg, resulting in 20 g of a powder polymer containing 8.6 percent by weight of m-cresol and having a number average molecular weight of about 10,000, a glass transition temperature of 260° C. and repeating units of the formula,

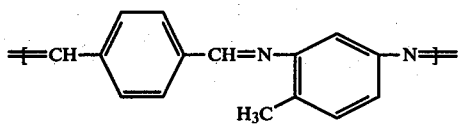

The polymer was subjected to a compression molding for 5 minutes using a molder maintained at 260° C. under a load of 250 Kg/cm$^2$ to a black, stiff stick having a length of 3 cm and a diameter of 5 mm.

EXAMPLE 18

In 200 ml of freshly distilled o-cresol were homogeneously dissolved 13.4 g of terephthalaldehyde and 14.2 g of 1,4-cyclohexanedimethylamine at 20° C. with stirring and the solution was stirred at 20° C. for 12 hours to give a viscous polymer solution. The polymer solution was poured into methanol to precipitate a polymer and the polymer was filtered off and dried at 80° C. for 2 hours and a white fibrillar polymer was obtained.

Also the polymer solution as described above was shaped into a film in the same manner as in Example 1 and was obtained a colorless film having a high tensile elongation, a high Young's modulus, a number average molecular weight of about 7,800 and repeating units of the formula,

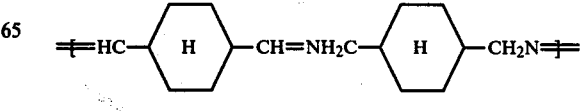

EXAMPLE 19

In 300 ml of freshly distilled m-cresol was homogeneously dissolved 13.4 g of isophthalaldehyde at 10° C. and then to the solution was added 10.9 g of 2,6-diaminopyridine at 10° C. with stirring. After stirring at 10° C. for 30 minutes, a viscous polymer solution was obtained.

The polymer solution was shaped into a film in the same manner as in Example 1, resulting in a yellow transparent film having a thickness of 30 microns, a number average molecular weight of about 24,000 and repeating units of the formula,

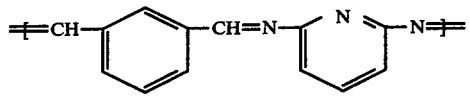

EXAMPLE 20

In 280 ml of freshly distilled m-cresol were homogeneously dissolved 8 g of isophthalaldehyde and 5.4 g of terephthalaldehyde at 20° C., and then to the solution was added 26.7 g of 3,3'-dichloro-4,4'-diaminodiphenylmethane at 20° C. with stirring. After stirring at 20° C. for 30 minutes, a viscous polymer solution was obtained, and then 80 ml of the m-cresol was distilled off therefrom at 80° C. under reduced pressure of 1 mm Hg. The yellow polymer solution thus obtained was cooled to 20° C. and poured into methanol to precipitate a yellow polymer. The polymer was filtered off and dried at 80° C. for 2 hours, resulting in 32 g of a yellow polymer having a number average molecular weight of about 12,000, a glass transition temperature of 300° C. and repeating units of the formula,

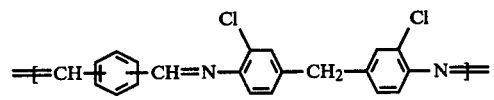

wherein the mole ratio of  to  was 6 to 4.

While the invention has been described in detail and with reference to specific embodiments thereof, it will be apparent to one skilled in the art that various changes and modifications can be made therein without departing from the spirit and scope thereof.

What is claimed is:

1. A process for preparing a polyimine having repeating units of the formula, $$\{CH-R^1-CH=N-R^2-N\}$$

wherein
$R^1$ represents a straight chain alkylene group having 1 to 12 carbon atoms, an alkylene group having 1 to 12 carbon atoms and, as a branched chain, at least one alkyl group having 1 to 4 carbon atoms,

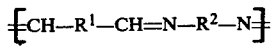

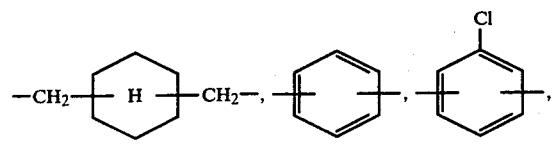

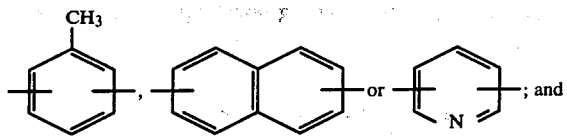

$R^2$ represents a straight chain alkylene group having 1 to 12 carbon atoms, an alkylene group having 1 to 12 carbon atoms and, as a branched chain, at least one alkyl group having 1 to 4 carbon atoms, an ether alkylene group having 2 to 6 carbon atoms and 1 to 3 oxygen atoms, wherein
$R^3$ represents a methoxy group or a chlorine atom;
$R^4$ represents —O—, —S—, —SO$_2$—, —CH$_2$—, —C(CH$_3$)$_2$—, —CO$_2$—, —NH—, —CONH—, —HNOC—R$^6$—CONH— or —CONH—R$^6$—HNOC—, wherein $R^6$ represents —(CH$_2$)$_n$—, n being zero or an integer of 1 to 12,

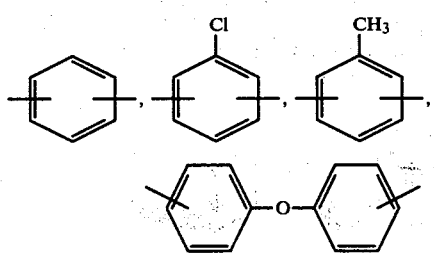

-continued

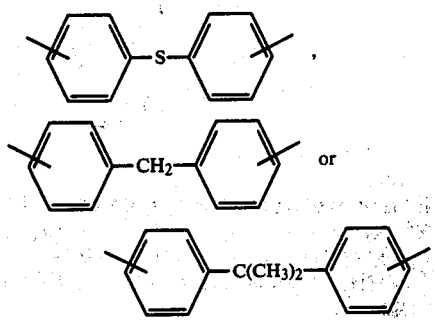

and R$^5$ represents a methyl group, methoxy group or a chlorine atom,
which comprises reacting at least one dialdehyde of the formula

OCH—R$^1$—CHO wherein R$^1$ is the same as defined above, with at least one diamine of the formula

H$_2$N—R$^2$—NH$_2$ wherein R$^2$ is the same as defined above,
in a reaction medium of 100 to about 40 percent by volume of a phenolic compound of the formula,

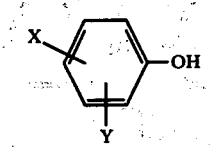

wherein
X represents a hydrogen atom or a methyl group; and
Y represents a hydrogen atom, a chlorine atom or a methyl group,
and 0 to about 60 percent by volume of a liquid which is miscible with the phenolic compound.

2. The process as claimed in claim 1, wherein the phenolic compound is at least one member selected from the group consisting of phenol, o-chlorophenol, m-chlorophenol, p-chlorophenol, o-cresol, m-cresol, p-cresol, 2,4-xylenol, 3,4-xylenol, 2,5-xylenol and 3,5-xylenol.

3. The process as claimed in claim 2, wherein the phenolic compound is m-cresol.

4. The process as claimed in claim 1, wherein the reaction medium contains at most about 40 percent by volume of a liquid which is miscible with the phenolic compound.

5. The process as claimed in claim 1, wherein the liquid which is miscible with the phenolic compound is one member selected from the group consisting of hydrocarbons and halogenated hydrocarbons.

6. The process as claimed in claim 5, wherein the hydrocarbon is one member selected from the group consisting of toluene, xylene, diphenyl, diphenylmethane and diphenylether.

7. The process as claimed in claim 5, wherein the halogenated hydrocarbon is one member selected from the group consisting of methylene chloride, chloroform, tetrachloroethane, chlorobenzene and hexafluoroisopropanol.

8. The process as claimed in claim 1, wherein the reaction is carried out in the presence of a dehydrating agent.

9. The process as claimed in claim 8, wherein the dehydrating agent is one member selected from the group consisting of calcium chloride, lithium chloride, potassium carbonate and phosphorus pentoxide.

10. The process as claimed in claim 8, wherein the dehydrating agent is used in an amount of at most about 10 percent by weight based on the total weight of the dialdehyde and the diamine employed.

11. The process as claimed in claim 1, wherein part of the reaction medium is removed during or after the reaction from the reaction system by distillation.

12. The process as claimed in claim 1, wherein the dialdehyde is at least one member selected from the group consisting of terephthalaldehyde and isophthalaldehyde.

13. The process as claimed in claim 1, wherein the diamine is at least one member selected from the group consisting of hexamethylenediamine, 1,3-cyclohexanedimethylamine, 1,4-cyclohexanedimethylamine, p-phenylenediamine, m-phenylenediamine, 2,4-diaminopyridine, 2,5-diaminopyridine, 2,6-diaminopyridine, 2,4-diaminotoluene, 2,5-diaminotoluene, 2,6-diaminotoluene, 2,4-diaminochlorobenzene, 2,5-diaminochlorobenzene, 2,6-diaminochlorobenzene, 2,5-diaminopyrazine, 3,3'-diaminobiphenyl, 4,4'-diaminobiphenyl, 3,3'-dimethoxy-4,4'-diaminobiphenyl, 3,3'-dichloro-4,4'-diaminobiphenyl, 3,3'-diaminodiphenylmethane, 4,4'-diaminodiphenylmethane, 3,3'-diaminodiphenylsulfone, 4,4'-diaminodiphenylsulfone, 4,4'-diaminodiphenylsulfide, 4,4'-diaminodiphenylether, 4,4'-diaminodiphenylpropane, 3,3'-diaminodiphenylester, 3,3'-diaminodiphenylamide, 3,3'-dichloro-4,4'-diaminodiphenylmethane, 3,3'-dichloro-4,4'-diaminodiphenylether, 3,3'-dichloro-4,4'-diaminodiphenylpropane, 1,8-diaminonaphthalene, 1,5-diaminonaphthalene, 2,6-diaminonaphthalene and diamines of the formulae,

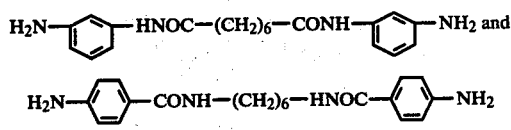

14. The process as claimed in claim 1, wherein the total amount of the dialdehyde and the diamine ranges from about 5 g to about 100 g per deciliter of the reaction medium.

15. The process as claimed in claim 14, wherein the total amount of the dialdehyde and the diamine ranges from about 10 g to about 50 g per deciliter of the reaction medium.

16. The process as claimed in claim 1, wherein the reaction temperature ranges from about −10° C. to about 200° C.

17. The process as claimed in claim 16, wherein the reaction temperature ranges from about 0° C. to about 120° C.

18. The process as claimed in claim 16, wherein the reaction temperature ranges from about 5° C. to about 30° C.

19. A polymer solution obtained by the process as claimed in claim 1.

20. A process for preparing a polyimine having repeating units of the formula,

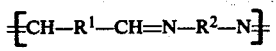

wherein
R¹ represents a straight chain alkylene group having 1 to 12 carbon atoms, an alkylene group having 1 to 12 carbon atoms and, as a branched chain, at least one alkyl group having 1 to 4 carbon atoms,

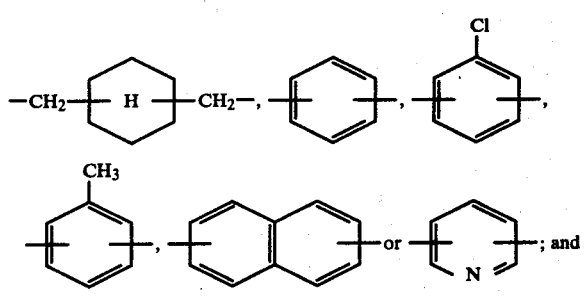

R² represents a straight chain alkylene group having 1 to 12 carbon atoms, an alkylene group having 1 to 12 carbon atoms and, as a branched chain, at least one alkyl group having 1 to 4 carbon atoms, an ether alkylene group having 2 to 6 carbon atoms and 1 to 3 oxygen atoms,

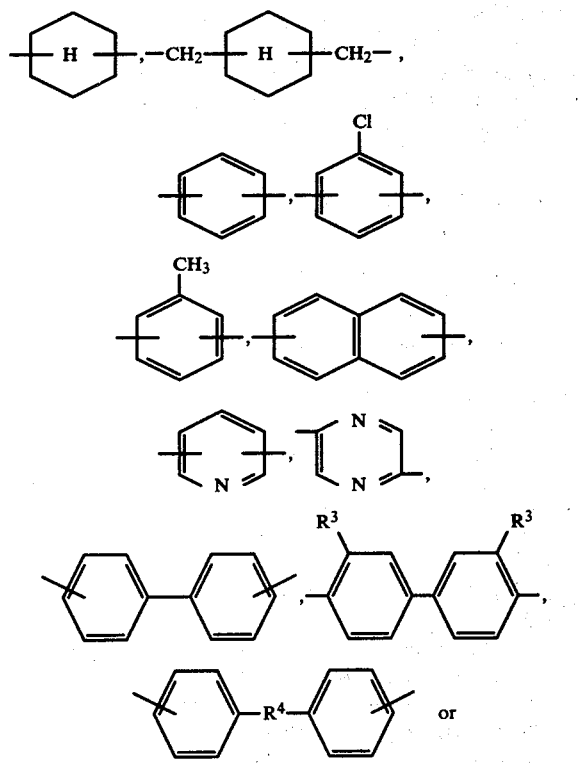

-continued

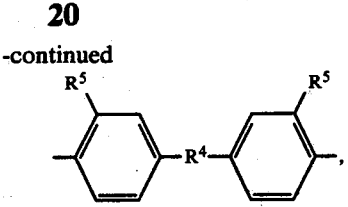

wherein
R³ represents a methoxy group or a chlorine atom;
R⁴ represents —O—, —S—, —SO₂—, —CH₂—, —C(CH₃)₂—, —CO₂—, —NH—, —CONH—, —HNOC—R⁶—CONH— or —CONH—R⁶—HNOC—,
wherein R⁶ represents —(CH₂)ₙ, n being zero or an integer of 1 to 12,

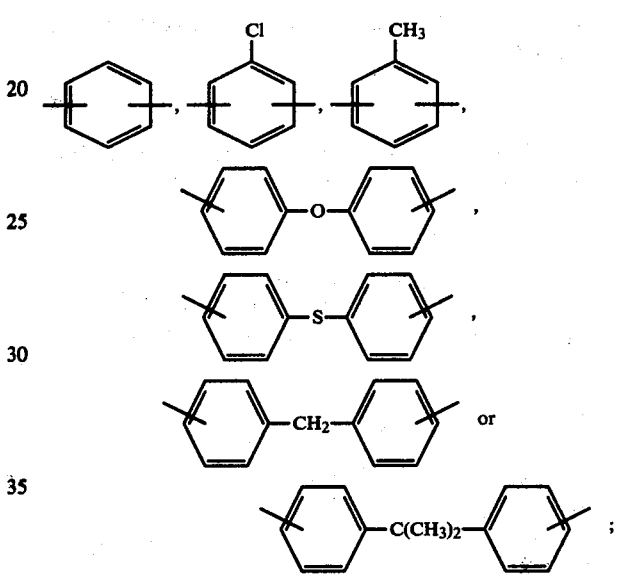

and R⁵ represents a methyl group, methoxy group or a chlorine atom,
which comprises polymerizing a polyimine having repeating units of the formula,

wherein R¹ and R² are the same as defined above, and a number average molecular weight of at most 3,000 to a higher molecular weight in a reaction medium of 100 to about 40 percent by volume of a phenolic compound of the formula,

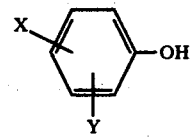

wherein X represents a hydrogen atom or a methyl group; and Y represents a hydrogen atom, a chlorine atom or a methyl group,
and 0 to about 60 percent by volume of a liquid which is miscible with the phenolic compound.

* * * * *